F. W. OSTROM.
Assignor to the WHEELER & WILSON MANUFACTURING COMPANY.
BUTTON HOLE CUTTING ATTACHMENT FOR BUTTON HOLE SEWING MACHINES.
No. 10,803. Reissued Feb. 1, 1887.
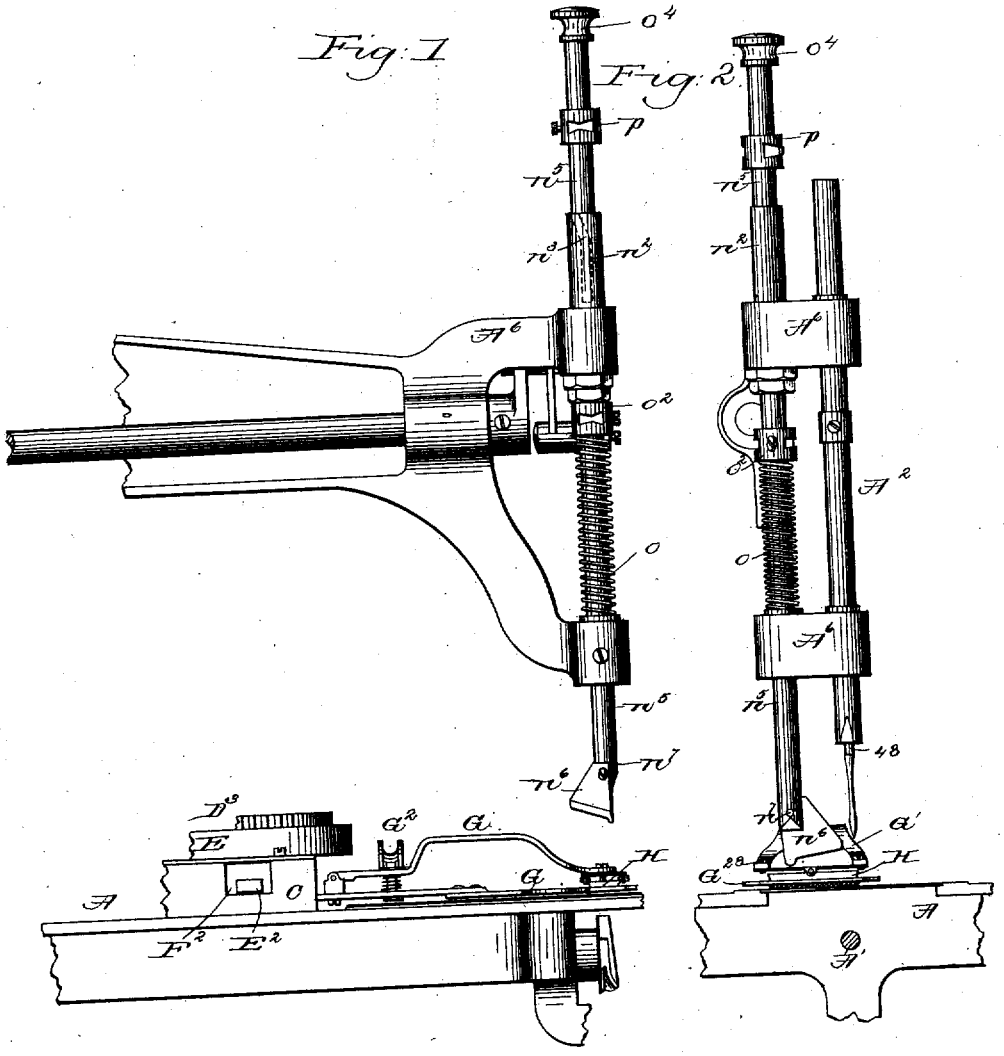
Witnesses
Thos. L. Emery
John F. C. Prinsloch
Inventor
Freeland W. Ostrom
by Crosby & Gregory Attys.

UNITED STATES PATENT OFFICE.

FREELAND W. OSTROM, OF BRIDGEPORT, CONNECTICUT, ASSIGNOR TO THE WHEELER & WILSON MANUFACTURING COMPANY, OF SAME PLACE.

BUTTON-HOLE-CUTTING ATTACHMENT FOR BUTTON-HOLE SEWING-MACHINES.

SPECIFICATION forming part of Reissued Letters Patent No. 10,803, dated February 1, 1887.

Original No. 303,454, dated August 12, 1884. Application for reissue filed May 6, 1886. Serial No. 201,391.

*To all whom it may concern:*

Be it known that I, FREELAND W. OSTROM, a citizen of the United States, residing at Bridgeport, Connecticut, have invented certain new and useful Improvements in Button-Hole-Cutting Machines, of which the following is a description.

My invention has for its object the construction of a simple mechanism by which the cloth or material in which a button-hole is to be made may be quickly and accurately cut while the cloth or material is held under the foot of the cloth carrier or clamp, and while the said clamp is yet in position, to enable the material inside the foot to be entered by the needle.

In accordance with my invention the cutting mechanism is so constructed that it is unnecessary to remove the cloth-clamp from its proper line of travel when the button-hole is being stitched, in order to cut a button-hole in the said material.

In this my invention I have removed from the sewing-machine the usual presser-bar, and in place of the same have substituted a cutter-bar provided at its lower end with a button-hole cutter, and to secure the correct alignment of the cutter with the center of the foot of the clamp I have provided the said bar with a guide. The bar is normally kept in elevated position by a spring, and the pin and guide referred to when the bar is elevated cause it to be so turned about its center as to throw the button-hole cutter away from under the needle-bar. The throat-plate is provided with a pivoted arm which serves as a co-operating member for the cutter carried by the bar.

Figure 1 in side elevation represents a sufficient portion of a button-hole sewing-machine to illustrate my invention; Fig. 2, a right-hand end view of Fig. 1, but with the cutter-bar forced partially down. Fig. 3 shows the pivoted arm of the throat-plate, and Fig. 4 a detail of the pin and guide for partially rotating the cutter-bar.

Referring to the drawings, G G′ H represent the clamp which holds and moves the material in which the button-hole is to be worked by a sewing mechanism such as represented in United States Patent No. 303,453, dated August 12, 1884, to which reference may be had, the parts common to the said patent being designated by like letters. The overhanging arm and head $A^6$, as herein shown, is that common to the Wheeler & Wilson machine. Having removed the usual presser-bar I attach to the head a sleeve, $n^2$, having an irregular slot, $n^3$, which is adapted to receive a pin, $n^4$, in the cutter-bar $n^5$, which is inserted in the head $A^6$, instead of the usual presser-bar. This bar is passed down through a spiral spring, $o$, supported at its lower end by the head, and an adjustable collar, $o^2$, secured to the bar $n^5$, rests upon the upper end of the spring, so that the latter normally acts to keep the bar $n^5$ elevated, as in Fig. 1, with the pin $n^4$ in the upper end of the slot $n^3$, as in Fig. 4, which so rotates the bar $n^5$ that the blade or cutter $n^6$, attached thereto by the screw $n^7$, is turned to one side away from the open top of the foot H of the cloth-clamp. While the material is held clamped under the foot, and the clamp is in such position as to permit the material held by it to be under the needle as to be penetrated by the needle inside the foot of the clamp, the operator will strike, by hand or otherwise, the head $o^4$ of the bar $n^5$, and will depress the same, causing the cutter or blade $n^6$ to pass down through the top of the foot H of the cloth-clamp and through the cloth clamped between its jaws, cutting a hole entirely through the cloth or material centrally with relation to the foot H and in the line of the feed of the cloth from end to end of the button-hole under the needle 48. In the descent of the bar $n^5$ as soon as the pin $n^4$ reaches the vertical part of the slot $n^3$ the cutter or blade $n^6$ is brought into central position (see Fig. 2) with relation to the foot H, and thereafter during the further descent of the bar $n^5$ it does not rotate.

To constitute a lower member or a shear-like device to co-operate with the blade $n^6$, the throat-plate $p^2$ is provided with an arm, $p^3$, pivoted at $p^4$, and acted upon by a spring, $p^5$, there being between the edge $p^6$ of said arm and the edge $p^7$ of the said throat a slit, down into which the cutter or blade descends after passing through the material held by the clamp, the descent of the cutter or blade being regulated by the adjustable collar $p$ on the bar $n^5$, which comes against the top of the sleeve $n^2$. As soon as the slit has been cut in the cloth, the spring *o* quickly lifts the bar into the position, Fig. 1.

I disclaim the employment of a cutting mechanism with a clamp when the said clamp has to be moved out of its proper line of travel for stitching in order to place the clamp and material in position to be cut by the cutter, for in my invention it will be noticed when the cutter operates to cut the material that the clamp is in such position under the needle that the latter will penetrate the material inside the open center of the foot H.

I claim—

1. In a sewing-machine, the cloth-plate, the slotted throat-plate, the head $A^6$, a clamp having an open foot to hold and feed the material, and a cutter-bar provided with a blade, combined with a guide, and a suitable pin cooperating therewith, whereby the bar will be partially rotated about its axis during its descent to bring the edge of the blade in the proper central position with relation to and to cut the material held by the clamp, the said bar during its ascent being turned in the opposite direction to remove the blade from the path of the needle and needle-bar, as and for the purposes set forth.

2. In a button-hole sewing-machine, the cloth-plate, the slotted throat-plate, and the clamp to hold and feed the material, a reciprocating and partially-rotating cutter-carrying bar provided with a blade to cut the material while held by the clamp immediately below the needle, combined with a spring to elevate the said bar, and with means, substantially as described, to regulate the extent of its downward motion, as and for the purposes set forth.

3. The cloth-plate, the slotted throat-plate, the needle-bar, its needle, and the partially-rotating slide-bar and its attached cutter, combined with the cloth-clamp having an open foot, H, to hold the material in position, substantially as described, under the needle, whereby the button-hole slit is cut while the material is held in position to be penetrated by the needle inside the foot of the clamp, substantially as described.

FREELAND W. OSTROM.

Witnesses:
G. W. GREGORY,
I. H. CHURCHILL.